(12) United States Patent
Suzuki et al.

(10) Patent No.: US 11,287,723 B2
(45) Date of Patent: Mar. 29, 2022

(54) ROTATIONAL OPERATION DEVICE AND ELECTRONIC APPARATUS USING THIS

(71) Applicant: CANON KABUSHIKI KAISHA, Tokyo (JP)

(72) Inventors: Yuto Suzuki, Tokyo (JP); Takayuki Iwasa, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/697,287

(22) Filed: Nov. 27, 2019

(65) Prior Publication Data

US 2020/0201140 A1    Jun. 25, 2020

(30) Foreign Application Priority Data

Dec. 21, 2018  (JP) .............................. JP2018-239842

(51) Int. Cl.
| | |
|---|---|
| *G03B 7/04* | (2021.01) |
| *G03B 17/02* | (2021.01) |
| *G05G 1/08* | (2006.01) |
| *G05G 5/03* | (2008.04) |
| *H04N 5/232* | (2006.01) |

(52) U.S. Cl.
CPC .............. *G03B 7/04* (2013.01); *G03B 17/02* (2013.01); *G05G 1/08* (2013.01); *G05G 5/03* (2013.01); *H04N 5/23245* (2013.01)

(58) Field of Classification Search
USPC ....................................................... 396/299
See application file for complete search history.

(56) References Cited

U.S. PATENT DOCUMENTS

| | | | | |
|---|---|---|---|---|
| 4,777,483 | A | * | 10/1988 | Fowler ................. G05B 19/104 200/11 DA |
| 5,283,606 | A | * | 2/1994 | Konno ................... G03B 7/091 396/299 |
| 9,195,381 | B2 | * | 11/2015 | Nakamura .......... G06F 3/04883 |
| 10,484,605 | B2 | | 11/2019 | Mabuchi |
| 2018/0278842 | A1 | * | 9/2018 | Mabuchi et al. .. H04N 5/23245 |

FOREIGN PATENT DOCUMENTS

JP          2018159773 A    10/2018

* cited by examiner

*Primary Examiner* — Clayton E. LaBalle
*Assistant Examiner* — Warren K Fenwick
(74) *Attorney, Agent, or Firm* — Rossi, Kimms & McDowell LLP

(57) ABSTRACT

A rotational operation device that is capable of setting an operation mode corresponding to a user's intention even when rotation of a rotational operation member stops on the way during a rotational operation. A rotational operation member is rotatable around a rotation axis. A click force application mechanism applies click force to the rotational operation member according to its rotational operation. A detection unit detects rotation of the rotational operation member. A setting unit sets one operation mode from among a plurality of predetermined operation modes in response to a detection output of the detection unit. The setting unit switches the operation mode according to a rotational operation of the rotational operation member before a position where the click force applied to the rotational operation member by the click force application mechanism becomes zero in a case where the rotational operation member is rotated in a first direction.

11 Claims, 9 Drawing Sheets

FIG. 6

| STOP POSITION | MODE | CODE No. | SIGNAL U1 | SIGNAL U2 | SIGNAL U3 | SIGNAL U4 |
|---|---|---|---|---|---|---|
| P1 | A | C1 | H | H | H | H |
| P2 | B | C2 | L | H | H | H |
| P3 | C | C3 | L | H | H | L |
| P4 | D | C4 | L | L | H | L |
| P5 | E | C5 | L | L | H | H |
| P6 | F | C6 | H | L | H | H |
| P7 | G | C7 | H | L | L | H |
| P8 | H | C8 | H | L | L | L |
| P9 | I | C9 | H | H | L | L |
| nothing | — | C10 | H | H | L | H |
| nothing | — | C11 | H | H | H | L |

ROTATIONAL OPERATION DEVICE AND ELECTRONIC APPARATUS USING THIS

BACKGROUND OF THE INVENTION

Field of the Invention

The present invention relates to a rotational operation device and an electronic apparatus using this, and in particular, relates to an electronic dial device mounted in an electronic apparatus, such as a digital camera.

Description of the Related Art

Generally, an electronic apparatus, such as a digital camera, a video camera, or a personal digital assistant, is provided with an electronic dial device for setting an operation mode and various settings. Then, an electronic dial device is configured to fix a substrate on which a conductive pattern is formed to an electronic device body and to fix phase contact piece that is formed like a plate spring and slides on the conductive pattern according to rotation of a dial to the dial.

Furthermore, the electronic dial device is provided with a click plate around which mountain parts and valley parts are alternately arranged in a rotational direction of the dial, a ball that fits into a valley part, and a spring that energizes the ball to the click plate. When a user rotates the dial, the ball overcomes a mountain part and fits into an adjacent valley part. As a result of this, the user is able to get click feeling during a rotational operation of the dial.

In such an electronic dial device, a rotational operation from a state where the ball fits into a valley part to a state where the ball fits into an adjacent valley part by overcoming a mountain part is defined as one click. Such an electronic dial device is used to select an operation mode of a camera, for example. The operation mode is determined by detecting a conductive state between the conductive pattern and the phase contact piece. For example, there is a known electronic dial device that stably detects the conductive state (signal) between the conductive pattern and phase contact piece without sacrificing operation feeling (Japanese Laid-Open Patent Publication (Kokai) No. 2018-159773 (JP 2018-159773A)).

However, the electronic dial device disclosed in this publication is designed without considering determination of the operation mode in a case where the rotation of the dial stops on the way of a rotational operation. The electronic dial device disclosed in the above-mentioned publication is designed so that the conductive state will vary (i.e., the determination result of the operation mode will be changed) when the ball passes the vertex of the mountain part. As a result, when the rotation of the dial stops at a position where the ball is located at the vertex of the mountain part, the determination result varies even when the dial rotates slightly.

Accordingly, since the determination of the operation mode is not stabilized, the operation mode may be changed against a user's intention.

SUMMARY OF THE INVENTION

The present invention provides a rotational operation device and an electronic apparatus using this that are capable of setting an operation mode corresponding to a user's intention even when rotation of a rotational operation member stops on the way during a rotational operation.

Accordingly, a first aspect of the present invention provides a rotational operation device including a rotational operation member that is rotatable around a rotation axis, a click force application mechanism that applies click force to the rotational operation member according to a rotational operation of the rotational operation member, a detection unit that detects rotation of the rotational operation member, and a setting unit that sets one operation mode from among a plurality of predetermined operation modes in response to a detection output of the detection unit. The setting unit switches the operation mode according to a rotational operation of the rotational operation member before a position where the click force applied to the rotational operation member by the click force application mechanism becomes zero in a case where the rotational operation member is rotated in a first direction.

Accordingly, a second aspect of the present invention provides an electronic apparatus including the rotational operation device of the first aspect, and a controller that controls components of the electronic apparatus according to the operation mode set by the rotational operation device.

According to the present invention, even when the rotational operation member stops on the way during the rotational operation, an operation mode corresponding to a user's intention is settable.

Further features of the present invention will become apparent from the following description of exemplary embodiments with reference to the attached drawings.

BRIEF DESCRIPTION OF THE DRAWINGS

FIG. 6 is a view showing an example of a coding sequence table recorded in a storage unit shown in FIG. 2.

DESCRIPTION OF THE EMBODIMENTS

Figure 1:
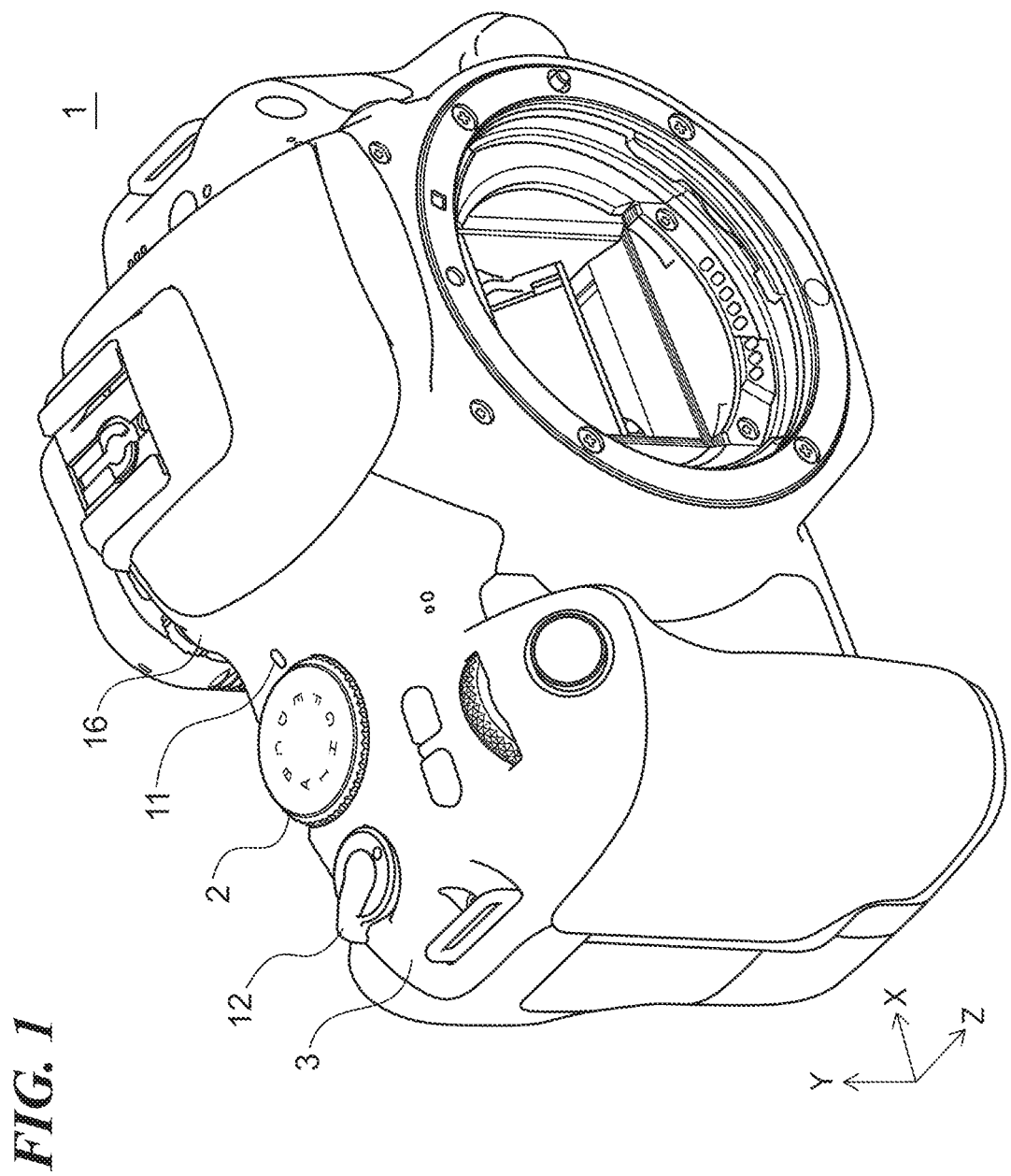
FIG. 1 is a perspective view showing a body of an image pickup apparatus (a camera) that is provided with a rotational operation device concerning an embodiment of the present invention.

Hereafter, an example of a rotational operation device concerning an embodiment of the present invention will be described by referring to the drawings.

FIG. 1 is a perspective view showing a body of an image pickup apparatus (a camera) that is provided with a rotational operation device concerning the embodiment of the present invention.

The illustrated image pickup apparatus body is a camera body 1 of a digital single lens reflex camera (hereinafter referred to as a camera, simply) in a state where an interchangeable lens (an image pickup optical system) is not attached, for example. A three-dimensional orthogonal coordinate XYZ is defined in drawings. The X axis is equivalent to a horizontal direction of the camera body 1. The left viewed from a back side of the camera body 1 is a +X direction and the right is a −X direction. The Y axis is equivalent to a vertical direction of the camera body 1. The up is a +Y direction and the down is a −Y direction. The Z-axis is parallel to an optical axis of the interchangeable lens. An object side is a +Z direction and the back side of the camera body 1 is a −Z direction. Then, a mode dial (a rotational operation member) 2 that is used to set various photographing conditions at a time of photographing is arranged on an upper surface of the camera body 1. The mode dial 2 is rotatable around a predetermined rotation axis that is parallel to the Y axis.

A user (an operator) is able to select (set) a photographing mode (mode) that sets up photographing conditions from among a shutter speed priority mode (Tv mode), an aperture value priority mode (Av mode), and the like by a rotational operation of the mode dial 2 in a clockwise direction (first direction) or a counterclockwise direction (second direction). Symbols of which the number is equal to the number of rotation phases (the number of states) of the mode dial 2 are printed on an upper surface of the mode dial 2. The symbols are printed on the mode dial 2 at predetermined angular intervals. The user is able to know which photographing mode is selected (set) by checking a symbol that is designated by an index 11 formed on an outside surface of an exterior cover (housing) 3.

A power source lever 12 is used to turn ON or OFF a power source of the camera. A finder unit 16 for observing an optical image of an object that is formed through the interchangeable lens is arranged in the upper portion of the camera body 1. Although the illustrated example describes the camera that consists of the camera body 1 and the interchangeable lens, an image pickup optical system may be integrated with the camera body.

Figure 2:
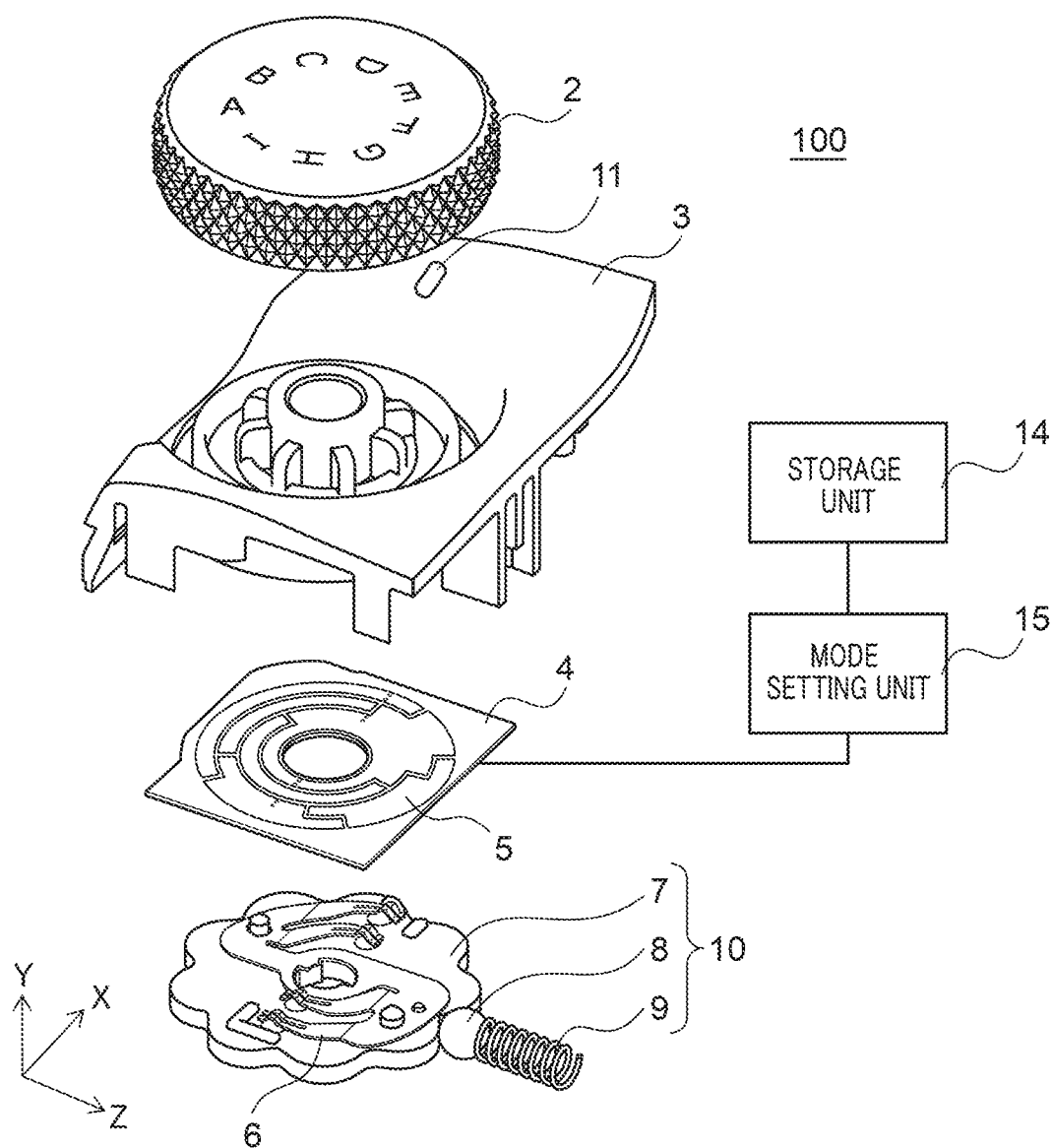
FIG. 2 is an exploded perspective view showing the rotational operation device (an electronic dial device) concerning the embodiment of the present invention.

FIG. 2 is an exploded perspective view showing the rotational operation device (hereinafter referred to as an electronic dial device) concerning the embodiment of the present invention.

The illustrated electronic dial device 100 is provided with the above-mentioned dial 2 and a flexible substrate (FPC, hard substrate) 4. A conductive pattern (rotation detection member) 5 is formed in an undersurface of the flexible substrate 4. A detection output corresponding to a rotational operation of the dial 2 is output from the conductive pattern 5, as mention later.

It should be noted that the conductive pattern 5 is shown by seeing through the flexible substrate 4 from the upper side in FIG. 2 in order to show the positional relationship of the phase contact piece 6 and a click plate 7 with respect to the conductive pattern 5.

A click force application mechanism 10 produces click feeling (i.e., applies click force) according to a rotational action of the dial 2. The click feeling generation section 10 has the click plate (regulation member) 7, a click ball (click member) 8, and a click spring 9.

The click plate 7 is provided with the phase contact piece (rotation member) 6, and the phase contact piece 6 rotates with the dial 2. The It should be noted that phase contact piece 6 is united with the click plate 7 by the heat caulking.

The mountain parts and valley parts (a concave-convex section) are alternately formed on an outer circumferential surface of the click plate 7. The number of the mountain parts and the number of the valley parts are equal to the number of the rotation phases of the dial 2. The click spring 9 energizes the click ball 8 toward the outer circumferential surface of the click plate 7. As a result of this, when the click ball 8 overcomes a mountain part from a valley part and fits into an adjacent valley part during the rotational operation of the dial 2, click feeling occurs. That is, the concave-convex section regulates rotation of the phase contact piece 6. It should be noted that the click force means force to rotate the click plate 7 and becomes zero when the click ball 8 contacts a bottom of a valley part and a vertex of a mountain part (hereinafter referred to as a valley part and a mountain part, simply).

A storage unit (memory) 14 stores a coding sequence table (code table) that will be mentioned later. A mode setting unit 15 sets a mode from among a plurality of modes (modes A through I mentioned later) corresponding to setting positions (stop positions P1 through P9 mentioned later) of the dial 2 on the basis of the code table stored in the storage unit 14.

Figure 3:
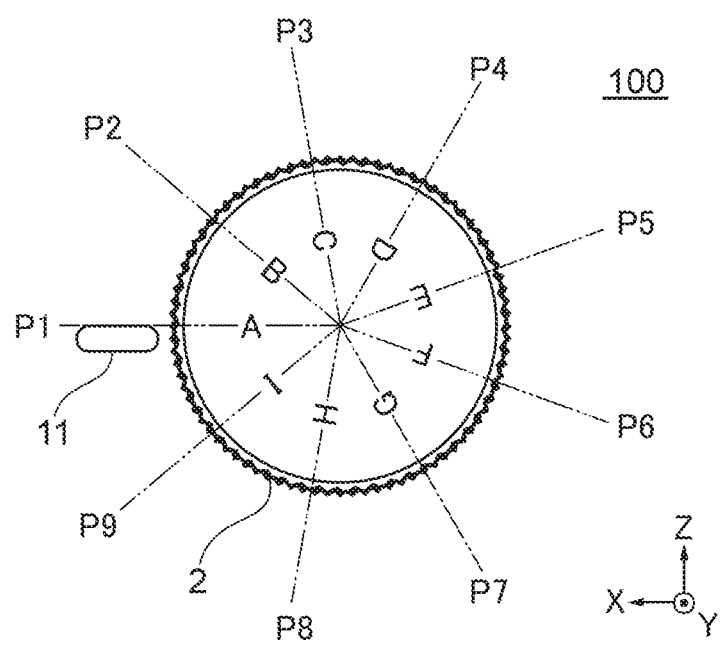
FIG. 3 is a top view showing the electronic dial device shown in FIG. 2.

FIG. 3 is a top view showing the electronic dial device shown in FIG. 2. Hereinafter, the relationship between the stop positions of the electronic dial device 100 and the modes (photographing modes) will be described by referring to FIG. 3.

As illustrated, nine modes "A", "B", "C", "D", "E", "F", "G", "H", and "I" are prescribed on the top surface of the dial 2 in response to the stop positions P1 through P9 of the dial 2, respectively. The stop positions P1 through P9 corresponding to the photographing modes A through I are arranged at angular intervals of 40 degrees. A user is able to select any mode from among the nine photographing modes by rotationally operating the dial 2.

In the illustrated example, there is no rotation end that disables the rotational operation of the dial 2 in the clockwise direction or the counterclockwise direction. Accordingly, the user is able to continue rotating the dial 2 in any of the clockwise direction and the counterclockwise direction.

Figure 4:
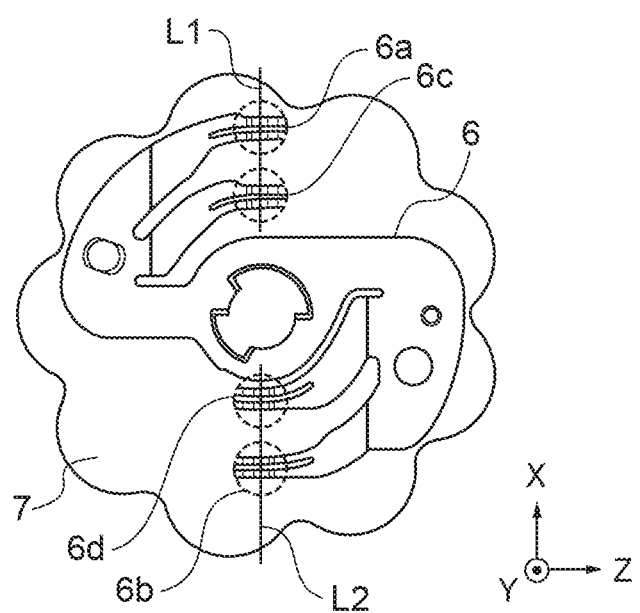
FIG. 4 is a top view for describing configurations of a phase contact piece shown in FIG. 2.

FIG. 4 is a top view for describing configurations of the phase contact piece shown in FIG. 2.

The phase contact piece 6 is formed from a conductive material plate having elastic property and has four spring parts. Contacts 6a, 6b, 6c, and 6d that contact with the conductive pattern 5 are formed at the front ends of the spring parts. The distances from the rotation center of the dial 2 to the contacts 6a, 6b, 6c, and 6d differ mutually, so that rotation loci of the four contacts 6a through 6d do not overlap mutually.

The contacts 6a through 6d are pressed to the conductive pattern 5 formed on the flexible substrate 4 by a predetermined load, so that the contacts electrically connect with the flexible substrate 4 stably. Furthermore, each of the contacts 6a through 6d has two divided contacts as illustrated. As a result of this, even when one of the divided contacts falls into a state that cannot conduct the conductive pattern 5 due to foreign substance, such as dust, the conductive state to the conductive pattern is held by the other divided contact.

A line segment L1 that connects the contacts 6a and 6c and a line segment L2 that connects the contacts 6b and 6d are coincident with a straight line that passes the rotation center of the dial 2. Moreover, the line segment L1 is set at an opposite position of the line segment L2 across the rotation center of the dial 2.

Since pressure load by the phase contact piece 6 is balanced with respect to the rotation center of the dial 2 as much as possible in this way, tilts of the phase contact piece 6 are reduced and poor feeling given to a user who rotationally operates the dial 2 is reduced.

Figure 5:
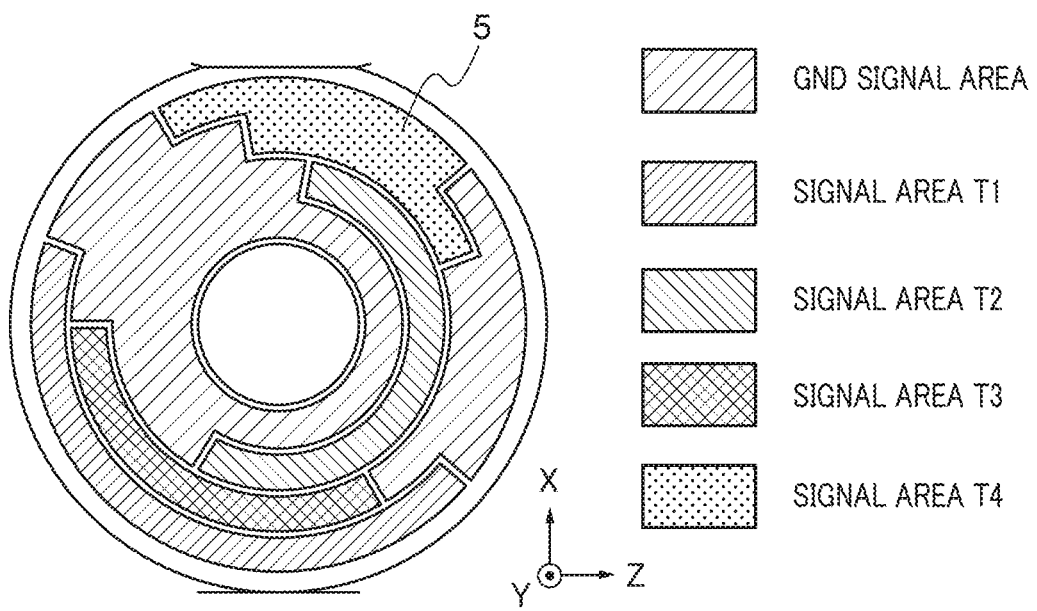
FIG. 5 is a view showing a conductive pattern formed on an undersurface of a flexible substrate shown in FIG. 2 while seeing through the flexible substrate.

FIG. 5 is a view showing the conductive pattern 5 formed on the under surface of the flexible substrate 4 shown in FIG. 2 while seeing through the flexible substrate 4. In the description, the conductive pattern 5 is shown while seeing through the flexible substrate 4 from the upper side in the same manner as FIG. 2.

The conductive pattern 5 has five signal areas (conductive areas) that are insulated mutually. The contacts 6a through 6d of the phase contact piece 6 contact and slide on the signal areas according to the rotation of the dial 2. It should be noted that one of the five signal areas is a reference potential signal (GND signal) area. The GND signal area is electrically connectable with the four remaining signal areas (conductive areas) T1, T2, T3, and T4 through the phase contact piece 6.

The illustrated example is able to switch signal potential (signal level) of each of the four signal areas between a high level (H level) and a low level (L level) according to the rotation phase (stop position) of the dial 2 corresponding to the position of the phase contact piece 6. Each of the signal areas T1, T2, T3, and T4 outputs a signal of the low level when it is electrically connected to the GND signal area with the phase section 6 and outputs a signal of the high level when it is not electrically connected to the GND signal area.

The high level means a state showing "1" of a binary digit. The low level means a state showing "0" of a binary digit. When the number of modes (mode number) of the dial is "n" ("n" is integer equal to or more than 2), the conductive pattern may have n kinds of signal areas so as to use a combination of signal levels of the signal areas.

However, since such a configuration increases the area of the conductive pattern according to the mode number n, not only the dial but the camera become large. Accordingly, the embodiment employs the Gray code that can reduce the number of signal areas by expressing each of the n kinds of modes by a combination of signal levels "0" and "1" (i.e., a binary number) of the signal areas.

The Gray code has a rule that a signal level of only one of a plurality of signals varies when shifting to an adjacent code.

Hereinafter, when a code (signal level) is described, the signal potential H level is expressed as "H" and the signal potential L level is expressed as "L". Moreover, signals from the signal areas T1, T2, T3, and T4 that constitute a coding sequence (a combination of signals that consist of two kinds of signal levels "H" and "L") are respectively shown as signals U1, U2, U3, and U4.

FIG. 6 is a view showing an example of a coding sequence table recorded in the storage unit 14 shown in FIG. 2. The coding sequence table shows relationship between a stop position, a mode (photographing mode), and a code.

As codes allocated to the dial 2 of which the number of stop positions is nine and the mode number is nine, eleven codes are prepared by adding two codes to nine codes for the nine modes. The eleven codes have mutually different coding sequences. Furthermore, the coding sequences are defined so that only one signal will vary when shifting to an adjacent code among the codes C1 through C9. That is, the coding sequences are defined so that a signal level of only one of the signals U1 through U4 will vary when a code is changed to an adjacent code. In addition, the coding sequences are defined so that a signal level of only one signal will vary when the code is changed from C9 to C10 or from C10 to C1. Similarly, the coding sequences are defined so that a signal level of only one signal will vary when the code is changed from C9 to C11 or from C11 to C1.

The stop positions P1 through P9 corresponding to the codes C1 through C9 are defined, but there are no stop positions corresponding to the codes C10 and C11A (stop position "nothing" in FIG. 6). Then, the modes A through I are allocated to the codes C1 through C9, respectively. Furthermore, the same mode allocated to the code C1 or C9 (i.e., the mode A or I) will be allocated to the codes C10 and C11. In the illustrated example, the mode I is allocated to the codes C10 and C11.

It should be noted that the mode A or I has only to be allocated to the codes C10 and C11. The same mode (A or I) may be allocated to both the codes C10 and C11. Different modes may be allocated to the codes C10 and C11 (one is the mode A and the other is the mode I).

Figure 7A:
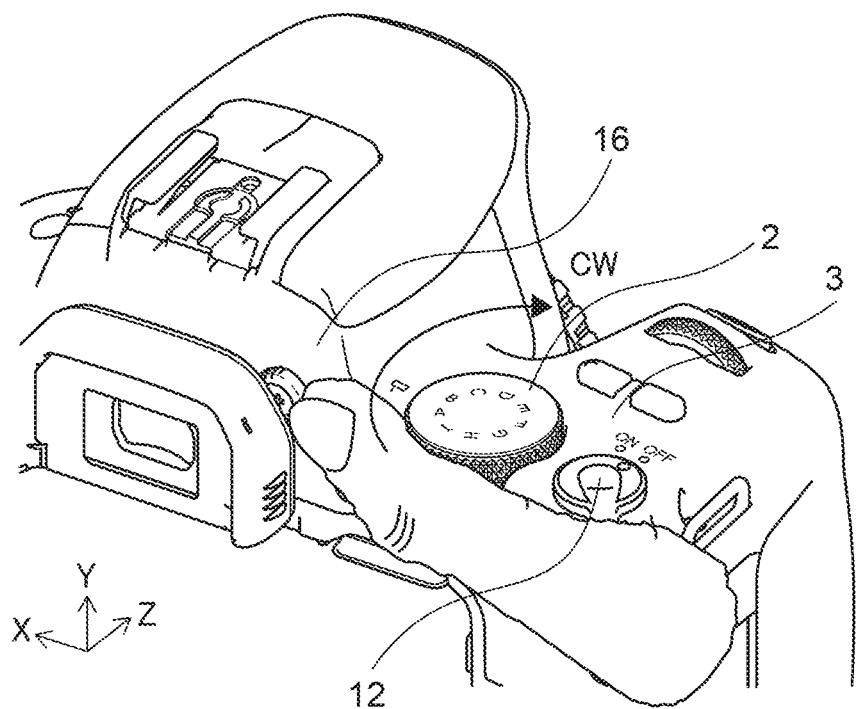
FIG. 7A and FIG. 7B are perspective views showing user's rotational operations of a dial of the camera shown in FIG. 1.
Figure 7B:
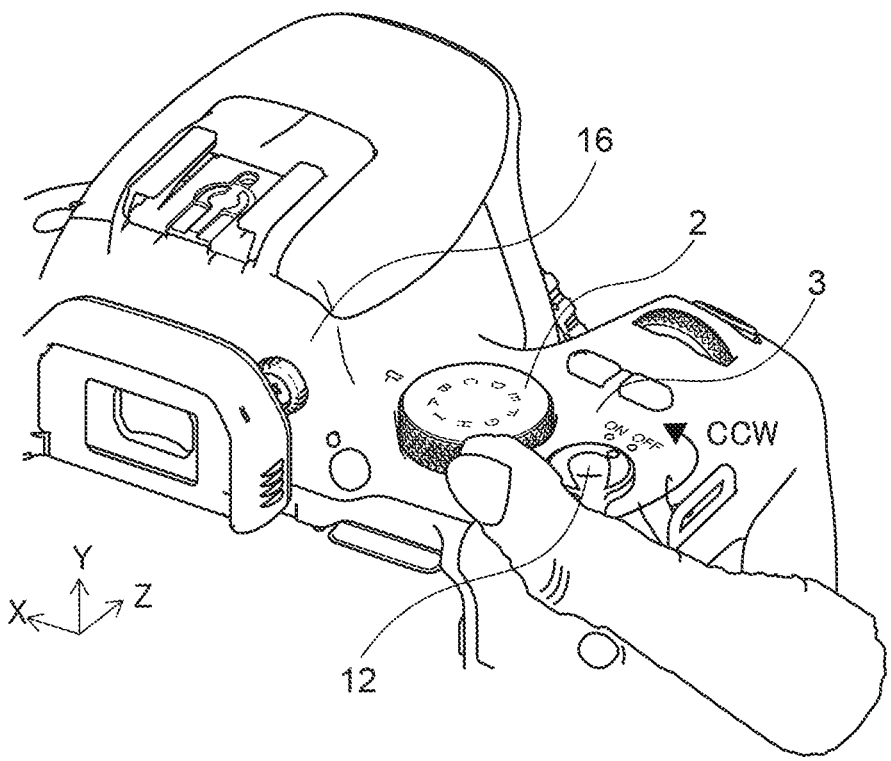

FIG. 7A and FIG. 7B are perspective views showing user's rotational operations of the dial of the camera shown in FIG. 1. FIG. 7A shows a state where the dial is rotationally operated in clockwise, and FIG. 7B shows a state where the dial is unintentionally operated in counterclockwise.

Figure 8A:
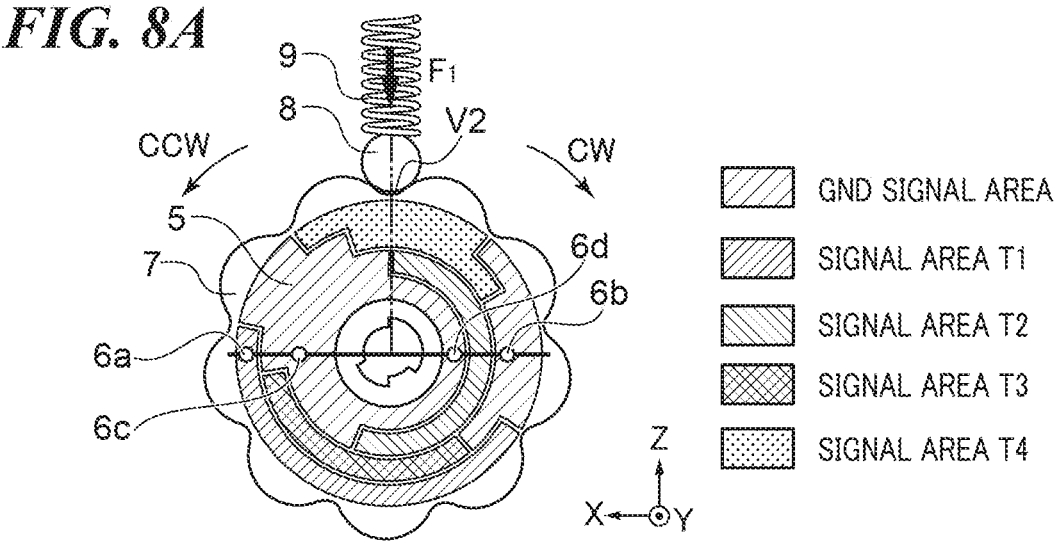
FIG. 8A, FIG. 8B, and FIG. 8C are views showing examples of positional relationships of the phase contact piece and a click plate with respect to the conductive pattern when the electronic dial device shown in FIG. 2 is rotationally operated.
Figure 8B:
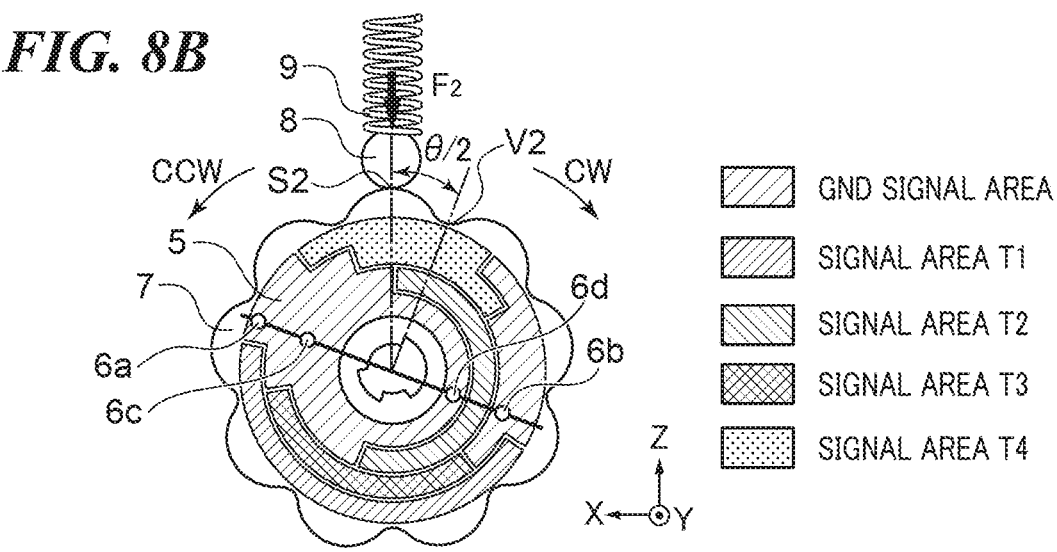
Figure 8C:
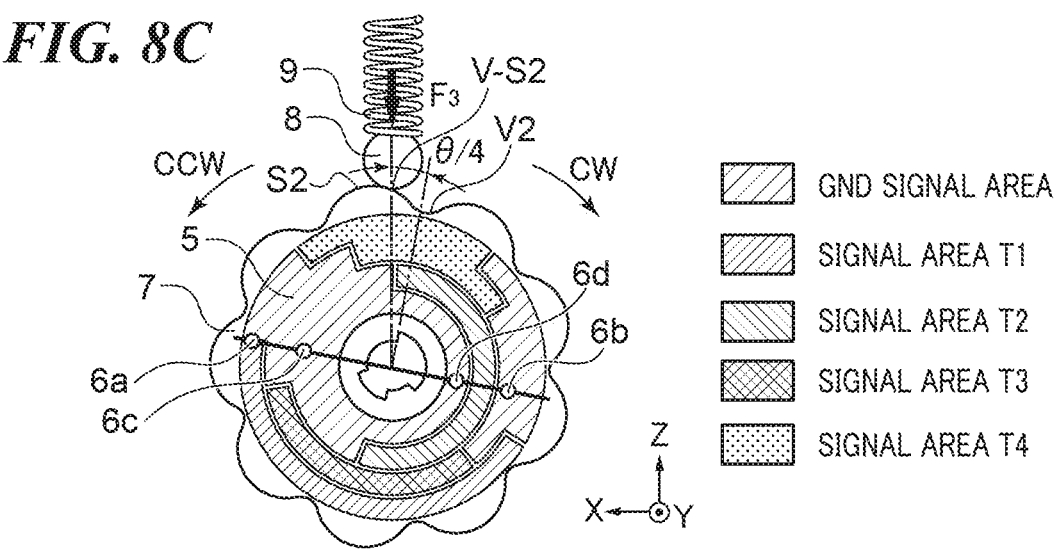
Figure 9A:
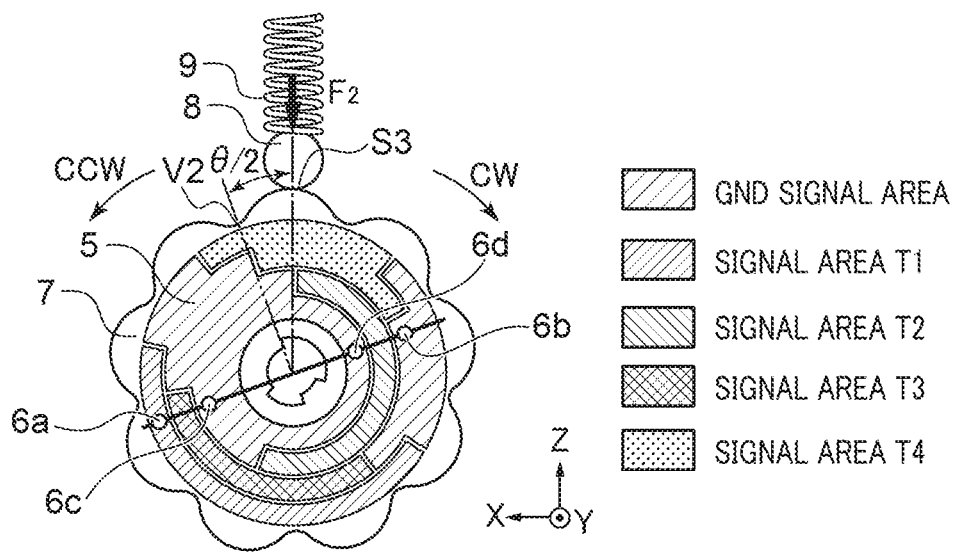
FIG. 9A and FIG. 9B are views showing other examples of positional relationships of the phase contact piece and the click plate with respect to the conductive pattern when the electronic dial device shown in FIG. 2 is rotationally operated.
Figure 9B:
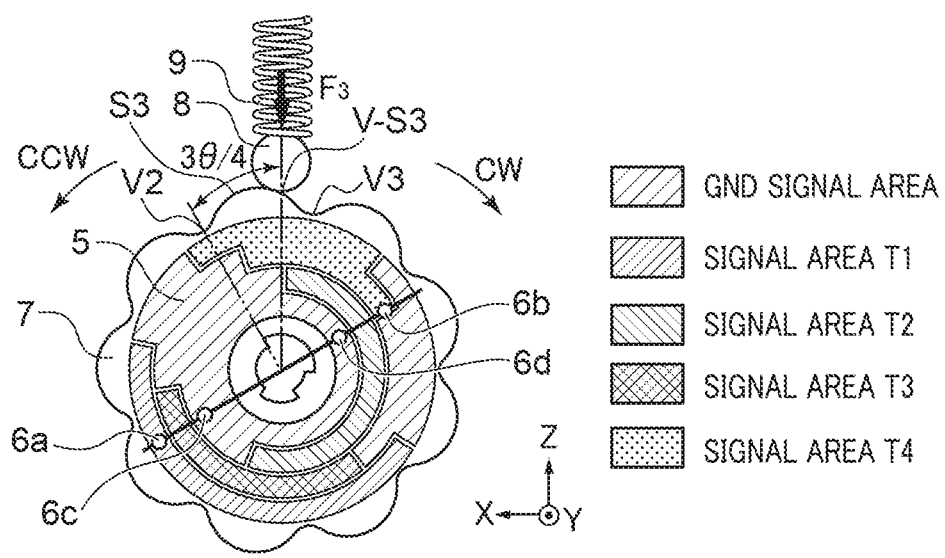

FIG. 8A, FIG. 8B, FIG. 8C, FIG. 9A, and FIG. 9B are views showing of positional relationships of the phase contact piece 6 and click plate 7 with respect to the conductive pattern 5 in cases where the electronic dial device shown in FIG. 2 is rotationally operated. FIG. 8A through FIG. 8C are views for describing the positional relationships of the phase contact piece 6 and click plate 7 with respect to the conductive pattern 5 in cases where the dial is rotationally operated in clockwise. Moreover, FIG. 9A and FIG. 9B are views for describing the positional relationships of the phase contact piece 6 and click plate 7 with respect to the conductive pattern 5 in cases where the dial is rotationally operated in counterclockwise.

Mode setting in a case where a user rotationally operates the dial 2 in clockwise (CW) will be described first by referring to FIG. 7A, FIG. 8A, FIG. 8B, and FIG. 8C.

A rotation angle θ between the adjacent stop positions is equal to an angle between the adjacent valley parts of the click plate 7 and is decided by the mode number n of the dial 2. In the illustrated example, since the mode number n of the dial 2 equals 9, θ=360/9=40 degrees.

The user shall rotationally operate the dial 2 in the CW direction as shown in FIG. 7A. FIG. 8A shows the positional relationship of the phase contact piece 6 and click plate 7 with respect to the conductive pattern 5 in a case where the dial 2 is located at the stop position P2. In the phase contact piece 6, the contact 6a is connected to the signal area T1 of the conductive pattern 5, and the contacts 6b through 6d are connected to the GND signal area. In this case, the phase contact piece 6 is connected to the conductive pattern 5 in the combination of the signal levels "LHHH" corresponding to the code C2. In this case, the mode setting unit 15 sets the mode B on the basis of the code table.

The click ball 8 fits into a valley part V2 of the click plate 7 and is pushed to the click plate 7 in its radial direction by energization force F1 of the click spring 9. As a result of this, the position of the click ball 8 is stabilized in the valley part V2. That is, the position of the dial 2 is stabilized at the stop position P2.

FIG. 8B shows the positional relationship of the phase contact piece 6 and click plate 7 with respect to the conductive pattern 5 in a case where the dial 2 is rotated from the stop position P2 by a rotation angle of θ/2=20 degrees in the CW direction. The dial 2 is located at the middle point between the stop position P2 and the stop position P1.

FIG. 8C shows the positional relationship of the phase contact piece 6 and click plate 7 with respect to the conductive pattern 5 in a case where the dial 2 is rotated from the stop position P2 by a rotation angle of θ/4=10 degrees in the CW direction. The dial 2 is located at the middle point between the valley part V2 and a mountain part S2 of the click plate 7.

In FIG. 8B, the phase contact piece 6 contacts the conductive pattern 5 in a state where the contacts 6a through 6d are connected to the GND signal area. In this case, the phase contact piece 6 is connected to the conductive pattern 5 in the combination of the signal levels "HHHH" corresponding to the code C1. In this case, the mode setting unit 15 sets the mode A on the basis of the code table.

The click ball 8 is located at the mountain part S2 of the click plate 7 and is pushed to the click plate 7 in its radial direction by energization force F2 of the click spring 9. As a result of this, the position of the dial 2 is stabilized between the stop position P2 and the stop position P1, specifically at the mountain part S2, and the dial 2 stops during the rotation toward the stop position P1 from the stop position P2.

In FIG. 8C, the phase contact piece 6 contacts the conductive pattern 5 in a state where the contact 6a is located between the signal area T1 and the GND signal area of the conductive pattern 5 and is not connected to neither the signal area T1 nor the GND signal area and where the contacts 6b through 6d are connected to the GND signal area. In this case, the output of the dial 2 is switched from the combination of the signal levels "LHHH" corresponding to the code C2 to the combination of the signal levels "HHHH" corresponding to the code C1.

The click ball 8 is located at a slant part V-S2 that is a middle point between the valley part V2 and the mountain part S2 of the click plate 7. The energization force F3 of the click spring 9 is distributed at the slant part V-S2, so that the click force of rotating the click plate 7 in the CCW direction is applied. As a result, the position of the click ball 8 becomes unstable at the slant part V-S2.

In the meantime, since the component force (click force) of the energization force F3 acts so as to rotate the click plate 7 in the CCW direction, the click ball 8 is pulled back to the valley part V2 and is stabilized. Accordingly, the dial 2 does not stop at the slant part V-S2.

As shown in FIG. 7A, the user shall rotate the dial 2 in the CW direction in order to switch the mode of the electronic dial device 100 from the mode B (stop position P2) to the mode A (stop position P1). In this case, a user's finger may hit the finder unit 16. As a result of this, the dial 2 may stop between the stop position P2 and the stop position P1, specifically at the mountain part S2 as shown in FIG. 8B because the user cannot completely rotate the dial 2 to the stop position P1.

In the meantime, the illustrated electronic dial device 100 has been already shifted to the combination of the signal levels "HHHH" (mode A) corresponding to the code C1 at the mountain part S2 as described by referring to FIG. 8B and FIG. 8C. Accordingly, even when the user rotates the dial 2 in the CW direction and stops at the mountain part S2 (the vertex where the click force becomes zero) as shown in FIG. 8B, the mode of the electronic dial device 100 will be set to the mode A corresponding to the user's operation intention.

Thus, when the dial 2 of which the number of stop positions is n (n is an integer equal to or more than 2) is rotationally operated in the CW direction, the mode setting unit 15 switches the operation mode at a position where the rotation angle from a stop position at which one of the symbols is designated by the index 11 becomes (360/n)/4 degrees.

That is, the mode setting unit 15 switches the operation mode according to a rotational operation of the dial 2 before a position where the click force applied to the dial 2 by the click force generation section 10 becomes zero in a case where the dial 2 is rotated in the CW direction.

It should be noted that a factor that disturbs the rotational operation of the dial 2 by the user is not limited to the finder unit 16. For example, if a convex member is arranged near the dial 2, the rotational operation of the dial 2 will be disturbed and will cause the above-mentioned stop on the way in the same manner.

Next, a case where the dial 2 has been rotated unintentionally in the CCW direction as shown in FIG. 7B when the user wants to rotationally operate the power source lever 12 in the CCW direction will be described by referring to FIG. 7B, FIG. 9A, and FIG. 9B.

FIG. 9A shows a position in a case where the dial 2 is rotated from the stop position P2 by a rotation angle of θ/2=20 degrees in the CCW direction. The dial 2 is located at the middle point between the stop position P2 and the stop position P3.

In FIG. 9A, the phase contact piece 6 contacts the conductive pattern 5 in a state where the contact 6a is connected to the signal area T2 and the other contacts 6b through 6d are connected to the GND signal area. In this case, the phase contact piece 6 is connected to the conductive pattern 5 in the combination of the signal levels "LHHH" corresponding to the code C2. In this case, the mode setting unit 15 sets the mode B on the basis of the code table.

In FIG. 9A, the position of the click ball 8 is stabilized at a mountain part S3 of the click plate 7 like the state in FIG. 8B. Then, the dial 2 stops at the mountain part S3.

In FIG. 9B, the dial 2 is in a position that is rotated from the stop position P2 by a rotation angle of 3θ/4=30 degrees in the CCW direction. In this case, the dial 2 is located at the middle point between a valley part V3 and the mountain part S2 of the click plate 7.

In FIG. 9B, the phase contact piece 6 contacts the conductive pattern 5 in a state where the contact 6b is not connected to neither the signal area T4 nor the GND signal area and where the contact 6a is connected to the signal area T1 and the contacts 6c and 6d are connected to the GND signal area. In this case, the output of the dial 2 is switched from the combination of the signal levels "LHHH" corresponding to the code C2 to the combination of the signal levels "LHHL" corresponding to the code C3.

In FIG. 9B, the click ball 8 is located at a slant part V-S3 that is a middle point between the valley part V3 and the mountain part S3 of the click plate 7 like the state in FIG. 8C. The energization force F3 of the click spring 9 is distributed at the slant part V-S3, so that the click force of rotating the click plate 7 in the CCW direction is applied. As a result, the position of the click ball 8 becomes unstable at the slant part V-S3.

In the meantime, since the component force (click force) of the energization force F3 acts so as to rotate the click plate 7 in the CCW direction, the click ball 8 is pushed out to the valley part V3 and is stabilized. Accordingly, the dial 2 does not stop at the slant part V-S3.

When the user rotates the power source lever 12 in the CCW direction in order to switch the power of the camera from OFF to ON, the user's finger may hit the dial 2 as shown in FIG. 7B. As a result of this, the user may rotate the dial 2 unintentionally in the CCW direction, so that the dial 2 may stop at the mountain part S3 between the stop position P2 and the stop position P3 as shown in FIG. 9A.

In the meantime, in the illustrated electronic dial device 100, the combination of the signal levels "LHHH" (mode B) corresponding to the code C2 is switched to the combination of the signal levels "LHHL" (mode C) corresponding to the code C3 at the slant part V-S3 beyond the mountain part S3 as mentioned above. Accordingly, the state at the mountain part S3 is the combination of signal levels "LHHH" (mode B) corresponding to the code C2.

Accordingly, even when the user rotates the dial 2 unintentionally in the CCW direction and the dial 2 stops at the mountain part S3 as shown in FIG. 9A, the mode of the electronic dial device 100 is maintained as the mode B.

Thus, when the dial 2 of which the number of stop positions is n (n is an integer equal to or more than 2) is rotationally operated in the CCW direction, the mode setting unit 15 switches the mode at a position where the rotation angle from a stop position at which one of the symbols is designated by the index 11 becomes 3(360/n)/4 degrees.

That is, the mode setting unit 15 switches the operation mode according to a rotational operation of the dial 2 behind a position where the click force applied to the dial 2 by the click force generation section 10 becomes zero in a case where the dial 2 is rotated in the CCW direction.

Accordingly, even when the dial 2 stops on the way while the user rotates the dial 2 so as to move between stop positions, a mode corresponding to the user's operation intention is set according to the embodiment of the present invention.

A controller (not shown) built in the camera controls various components in the camera according to the operation mode set by the electronic dial device 100.

Although the preferable embodiments of the present invention have been described above, the present invention is not limited to these embodiments, and various deformations and variations are available within the scope of the present invention.

For example, although the dial 2 is arranged at the −X side of the finder unit 16 so as to be rotatable around the axis parallel to the Y axis in FIG. 1, the dial 2 may be arranged at the +X side of the finder unit 16 so as to be rotatable around an axis parallel to the Y axis. Also in this case, the mode corresponding to the user's intention is settable as mentioned above.

Furthermore, even if the dial 2 is arranged below the finder unit 16 so as to be rotatable around an axis parallel to the X axis, the mode corresponding to the user's intention is settable in the similar manner.

Although the above-mentioned example described the camera equipped with the electronic dial device, the electronic dial device is applicable to electronic apparatuses other than a camera.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-239842, filed Dec. 21, 2018, which is hereby incorporated by reference herein in its entirety.

What is claimed is:

1. A rotational operation device comprising:
a rotational operation member that is rotatable around a rotation axis;
a click force application mechanism that applies click force to the rotational operation member according to a rotational operation of the rotational operation member;
a detection unit that detects rotation of the rotational operation member; and
a setting unit that sets one operation mode from among a plurality of predetermined operation modes in response to a detection output of the detection unit,
wherein the click force application mechanism comprises a regulation member on which a concave-convex section is formed along an outer circumferential surface to regulate rotation of the rotational operation member, a click member that contacts the concave-convex section, and an energization unit that energizes the click member to the outer circumferential surface of the regulation member, and
wherein the setting unit switches the operation mode according to a rotational operation of the rotational operation member before a position where the click member contacts a mountain part of the outer circumferential surface of the regulation member during a rotational operation of the rotational operation member, in a case where the rotational operation member is rotated in a first direction.

2. The rotational operation device according to claim 1, wherein the detection unit comprises:
a rotation member that rotates together with the rotational operation member, and
a rotation detection member that detects rotation of the rotation member.

3. The rotational operation device according to claim 2, wherein each of the rotation detection member and the rotation member has conductivity and the rotation detection member and the rotation member are electrically connected to each other.

4. The rotational operation device according to claim 3, wherein the rotation detection member has a plurality of conductive areas that are insulated mutually, and
wherein the rotation detection member outputs signal levels corresponding to connections between the rotation member and the conductive areas as the detection output.

5. The rotational operation device according to claim 2, wherein the rotational operation member prescribes stop positions of which number is n (n is equal to or more than 2) at predetermined angular intervals, and
wherein the setting unit switches the operation mode at a position where the rotation angle from a stop position becomes (360/n)/4 degrees in a case where the rotational operation member is rotated in the first direction.

6. The rotational operation device according to claim 1, wherein the setting unit switches the operation mode according to a rotational operation of the rotational operation member behind the position where the click member contacts the mountain part of the outer circumferential surface of the regulation member during the rotational operation of the rotational operation member, in the case where the rotational operation member is rotated in the first direction.

7. The rotational operation device according to claim 6, wherein the rotational operation member prescribes stop positions of which number is n (n is equal to or more than 2) at predetermined angular intervals, and
wherein the setting unit switches the operation mode at a position where the rotation angle from a stop position becomes 3(360/n)/4 degrees in a case where the rotational operation member is rotated in the second direction.

8. An electronic apparatus comprising:
a rotational operation device comprising:
   a rotational operation member that is rotatable around a rotation axis;
   a detection unit that detects rotation of the rotational operation member;
   a setting unit that sets one operation mode from among a plurality of predetermined operation modes in response to a detection output of the detection unit; and
   a click force application mechanism that applies click force to the rotational operation member according to a rotational operation of the rotational operation member; and
a controller that controls components of the electronic apparatus according to the operation mode set by the rotational operation device,
wherein the click force application mechanism comprises a regulation member on which a concave-convex section is formed along an outer circumferential surface to regulate rotation of the rotational operation member, a click member that contacts the concave-convex section, and an energization unit that energizes the click member to the outer circumferential surface of the regulation member, and
wherein the setting unit switches the operation mode according to a rotational operation of the rotational operation member before a position where the click member contacts a mountain part of the outer circumferential surface of the regulation member during a rotational operation of the rotational operation member, in a case where the rotational operation member is rotated in a first direction.

9. The electronic apparatus according to claim 8, wherein the rotational operation member is arranged on an outside surface of a housing of the electronic apparatus.

10. The electronic apparatus according to claim 9, wherein a convex part is arranged on the outside surface of the housing at a position to which a user's finger may hit in a case where the rotational operation member is rotated in the first direction.

11. The electronic apparatus according to claim 10, wherein the convex part is a finder unit for observing an optical image of an object.

* * * * *